United States Patent
Peres et al.

[11] Patent Number: 6,008,890
[45] Date of Patent: Dec. 28, 1999

[54] POSITIONING SYSTEM FOR THE ARM OF ORE CAR TURNING EQUIPMENT

[75] Inventors: Fernando Ramos Peres; Claudio Iorio Tessari, both of Espirito Santo, Brazil

[73] Assignee: Companhia Vale Do Rio Doce, Minas Derais, Brazil

[21] Appl. No.: 08/914,923

[22] Filed: Aug. 20, 1997

[30] Foreign Application Priority Data

Aug. 20, 1996 [BR] Brazil ...................................... 9603705

[51] Int. Cl.[6] .............. G01B 11/26; B60P 1/04; B65F 9/00

[52] U.S. Cl. ............... 356/152.1; 298/17 R; 414/361

[58] Field of Search ................ 356/152.1, 141.1, 356/141.2; 414/361; 298/17 R

[56] References Cited

U.S. PATENT DOCUMENTS

| | | | |
|---|---|---|---|
| 4,349,868 | 9/1982 | Brown | 364/157 |
| 4,691,446 | 9/1987 | Pitches et al. | 414/730 |
| 5,354,976 | 10/1994 | Makinen et al. | 414/911 |
| 5,649,600 | 7/1997 | Marsh | 172/4.5 |
| 5,682,311 | 10/1997 | Clark | 364/424.07 |

*Primary Examiner*—Stephen C. Buczinski
*Attorney, Agent, or Firm*—Helfgott & Karas, P C.

[57] ABSTRACT

The present invention is related to an improvement in the positioning system for the arm of ore transport car turning equipment which comprises a laser emitter device and a laser detection device, the first one placed on the arm of the car turning equipment, and comprising a collimator, a laser diode, a laser control circuit chip and power cable, while the detector is attached to the appropriate base at an adequate distance from the aforementioned arm.

4 Claims, 3 Drawing Sheets

POSITIONING SYSTEM FOR THE ARM OF ORE CAR TURNING EQUIPMENT

FIELD OF INVENTION

The present invention concerns an improvement in the positioning system for the arm of ore transport car turning equipment.

More specifically, the present invention concerns an improvement in a type of positioning system which comprises a transmitting and detection laser device with convergent lens collimation.

BACKGROUND OF INVENTION

In accordance with the knowledge of the experts in this matter, the arms designed for the turning equipment of loaded ore transport cars are correctly positioned so as to couple with the respective transport cars, either through a photoelectric positioning system, or through a magnetic sensor, or still by laser detection on a scale of sensors.

Nevertheless, all of these known systems show functional problems or disadvantages in its application such as, the photoelectric positioner when covered with ore dust becomes inoperative and may even cause accidents. Also the vibrations may cause a maladjustment of the photoelectric cells which by virtue of operating on invisible light requires a substantial amount of time to be readjusted. On the other hand, the magnetic sensor presents the disadvantage of varying according to the temperature and by the fact to allow for irregular readings due to the presence of metallic materials. In addition, the laser sensor scale by requiring a large number of sensors has the inconvenience of being rather expensive.

SUMMARY OF INVENTION

In order to find a solution for these inconveniences, the present improvement in the positioning system for the arm of ore car turning equipment was developed envisioning a laser emitter and detector, the former attached to the turning arm and equipped with a collimator which turns the trajectory of a light beam parallel or almost so, while the second attached on an appropriate base and suitably distant from the aforementioned arm and comprising 4 to 6 convergent lenses placed side by side forming a single block and each with an optical sensor. The emitter must be placed in such a position that the laser beam strikes the surface of the detector's lenses as perpendicular as possible in order to avoid deviations and problems in their functions.

The present improved system besides having a lower cost than the usual system has a high operating efficiency, thus having eliminated all the inconveniences of the prior systems.

BRIEF DESCRIPTION OF THE DRAWINGS

The present invention shall be described in reference to the attached drawings which are illustrated herein as an example without any limitations, in which.

DETAILS OF THE INVENTION

Figure 1:
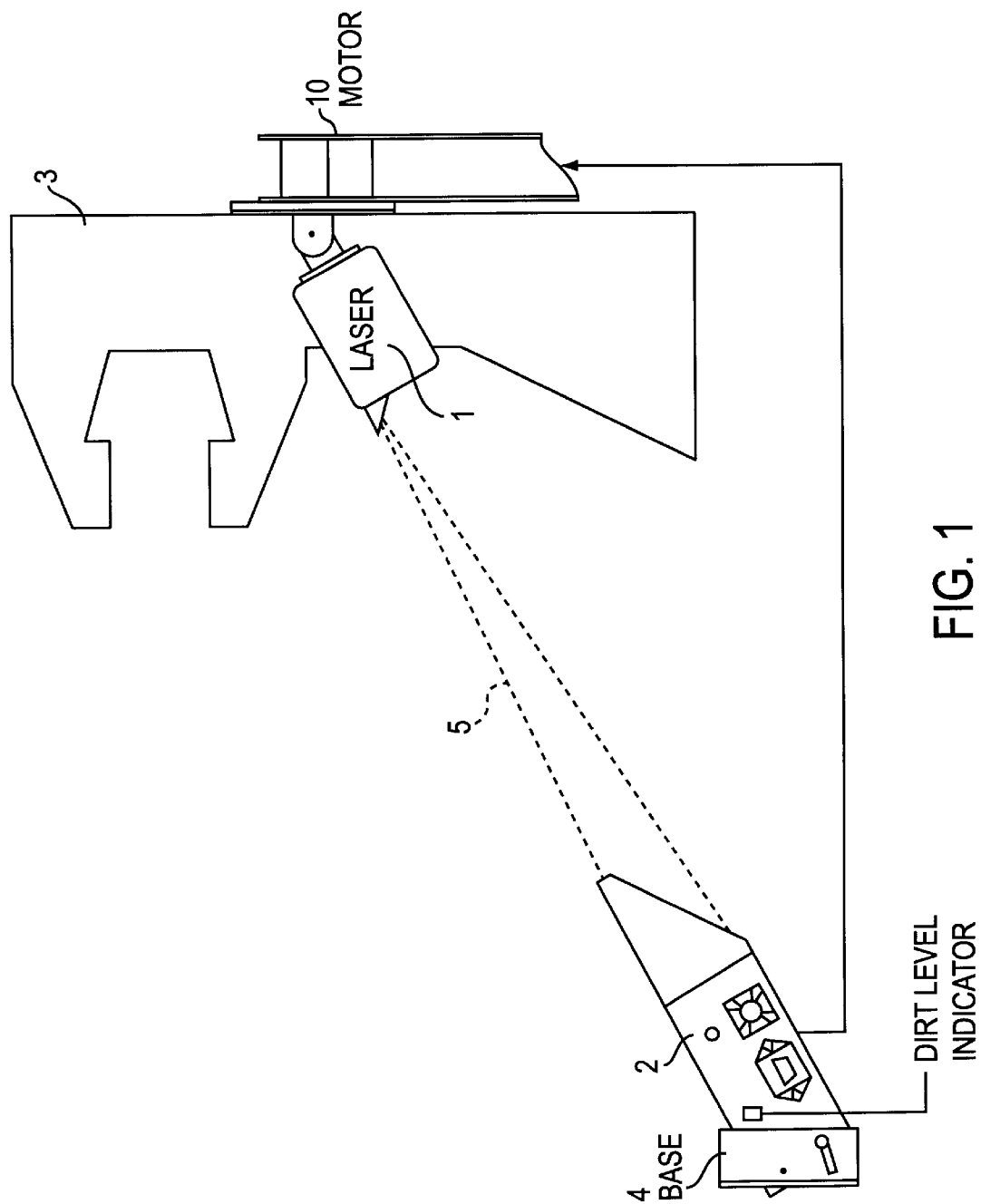
FIG. 1 represents a schematic side view of the positioning system for the arm of ore transport car turning equipment of the present invention.
Figure 2:
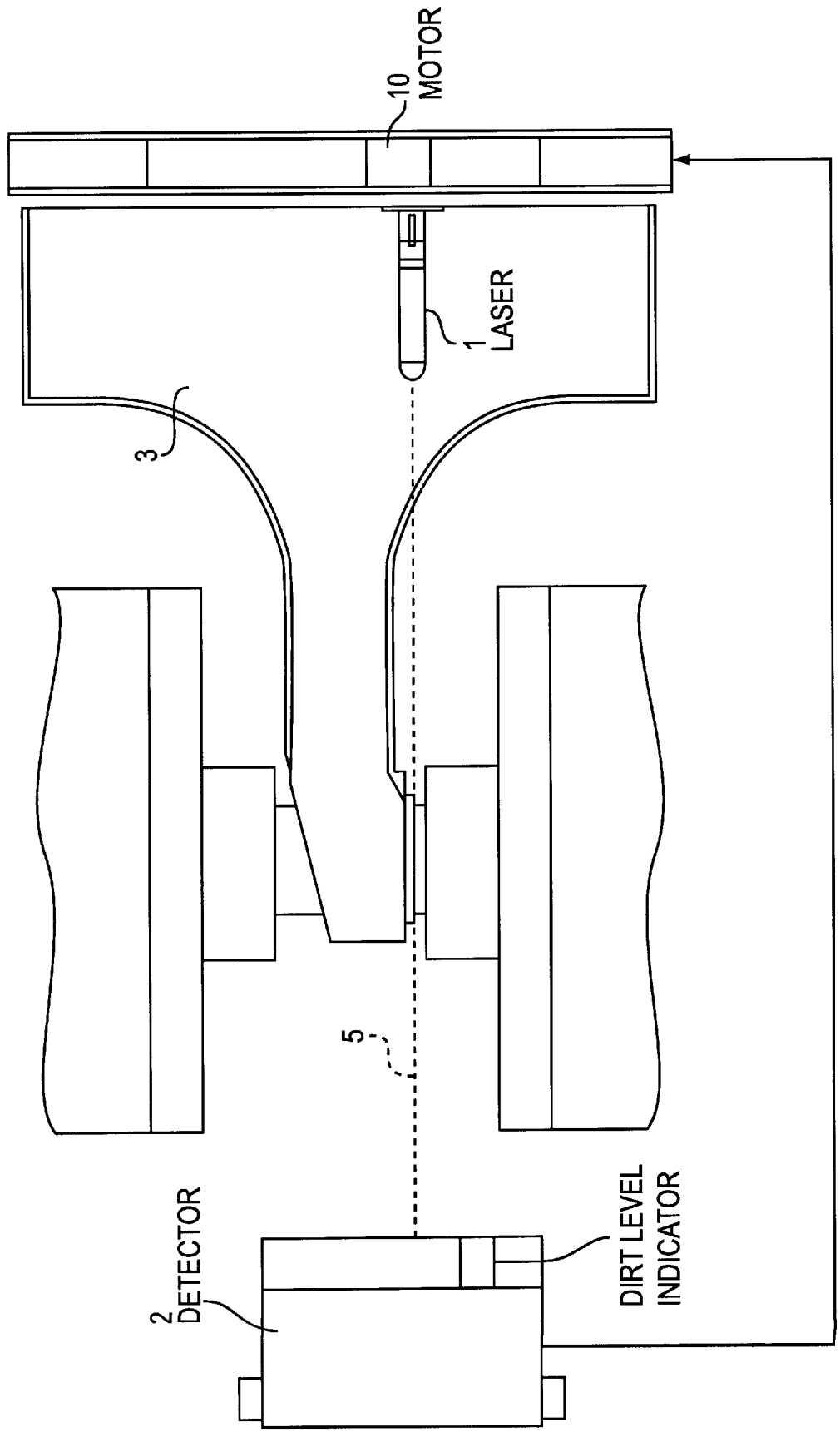
FIG. 2 represents the schematic top view of the positioning system of the invention.
Figure 3:
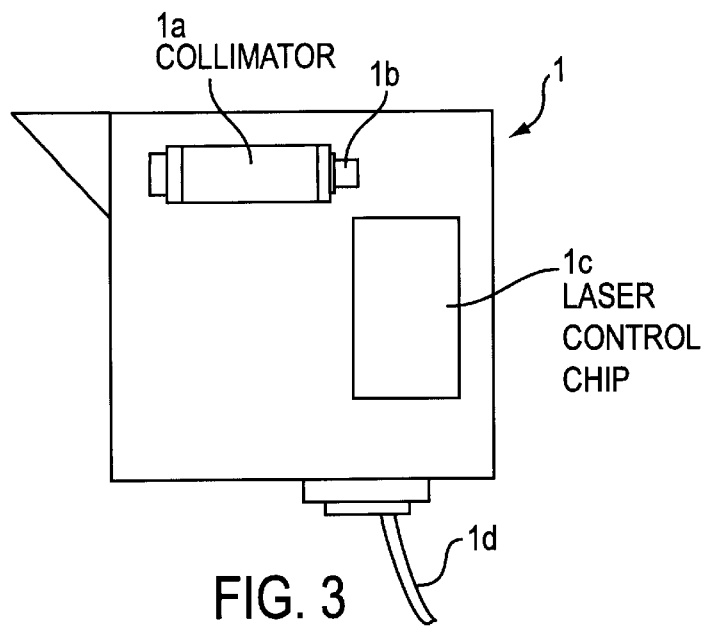
FIG. 3 represent an inside and schematic side view of the emitter device of which consists the present improvement.

In accordance with the above-cited drawings, the improvement in the positioning system for the arm of ore transport car turning equipment which is the purpose of the present invention comprises a laser transmitting device 1 and a laser detection device 2; the first one placed on arm 3 of the car's turning mechanism and comprising a collimator 1a, a laser diode 1b, a laser controlling circuit chip 1c, and a power cable 1d. Detector 2 is attached to the appropriate base 4, adequately distant from arm 3 and consisting of a set of lenses 2a located side by side making up a single block, a sensor scale 2b where the sensors 2c are placed, one sensor 2c for each lens 2a, and an electronic power chip 2d of the power source. Further the detector comprises a signal receiving chip 2e and an electronic dirt level control chip 2f.

The emitter device 1 must be positioned in a way so as to direct the laser beam 5 to hit the surfaces of lens 2a of the detection device as perpendicularly as possible to avoid any deviations and problems of functions.

Figure 4:
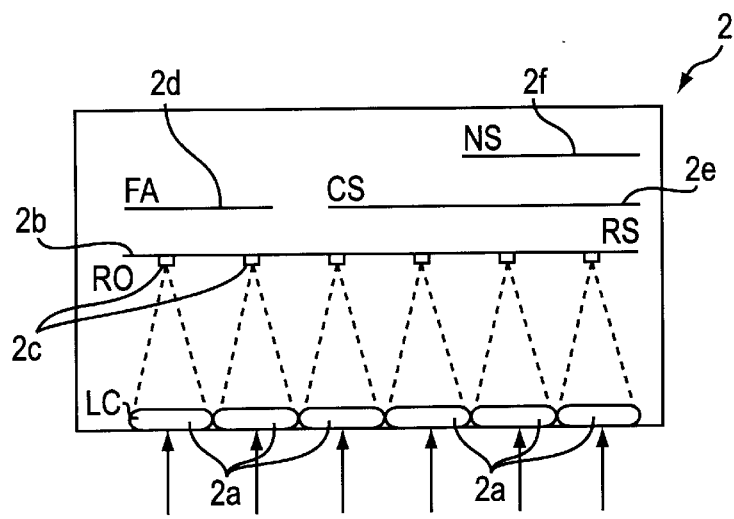
FIG. 4 represents the inside schematic top view of the detection device.
Figure 5:
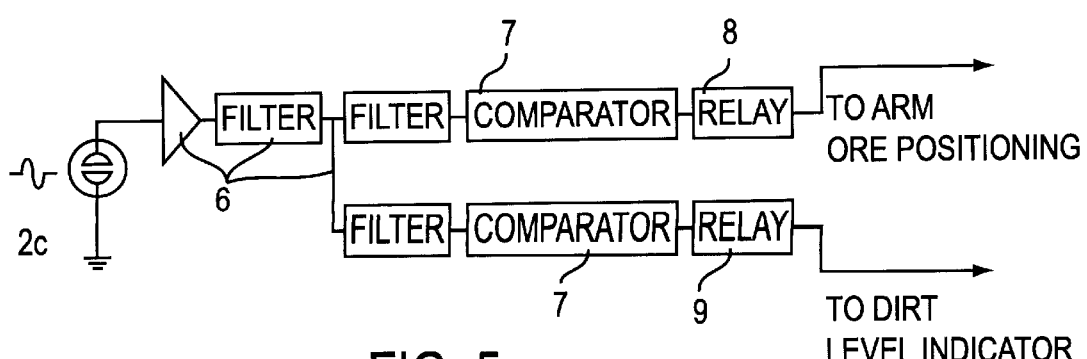
FIG. 5 represents a schematic block diagram of the signal processing.

As represented in the FIG. 4, the laser beam 5 is projected onto the receiving lenses 2a and sent to sensors 2c which generated signal undergoes amplifying and filtering stages through the corresponding filters and amplifiers 6 until it reaches the comparator circuit 7. The circuit 7 activates the relay 8 which activates the arm 3 via feedback to motor 10 enabling positioning of the arm.

When the detector captures a laser signal within the operating band the relay 8 of the arm 3 will be activated and dirt level relay 9 will be off. If no signal arrives at the detector 2, the relay 8 of the arm 3 will be off and the dirt level relay 9 on, indicating that there is no laser signal at detector 2.

In the event that a laser signal is arriving at the detector 2 and if the relay 8 of the arm has not been turned on and should the relay 9 of the dirt level indicator be on, it might be because something is obstructing detector 2 or the signal is too low to operate the system.

Although a preferred configuration has been above described and shown to the improved positioning system for the arm of ore transport car turning equipment, it is important to point out that changes may be introduced without deviating from the scope of the present invention.

What is claimed:

1. An improvement in the positioning system for an arm of an ore transport car's turning equipment which comprises a laser emitter device and a laser detector device, said detector being attached to an appropriate base at an adequate distance from said arm and said detector having a set of lenses placed side by side in order to constitute a single block, a scale plate of sensors on which are placed a sensor for each lens, an electronic chip connected to a power source, a signal capturing electronic chip, and a dirt level control electronic chip; the improvement comprising locating the laser emitter device on said arm of the car's turning equipment wherein said laser emitter device comprises a collimator, a laser diode, a laser controlling circuit chip and a power cable to enable positioning of the arm with respect to the base.

2. The improvement in the positioning system for the arm of ore transport car turning equipment of claim 1 wherein the laser emitter device is positioned so that a laser beam emitted from the laser emitter device reaches the surface of lenses of the detector device perpendicularly; said laser beam being projected into and out of the lenses and being sent to the sensors which generate an electrical signal which goes through amplifying and filtering stages until arriving at a comparator circuit for activating a relay controlling the arm of the equipment.

3. A method for positioning an arm of an ore transport car's turning mechanism, on which arm a laser emitter device is located, comprising the following steps:

>  transmitting a laser beam from a laser emitter device on the arm of the car's turning mechanism, said laser emitter device having a collimator, a laser diode, a laser controlling circuit chip, and a power cable;
>
>  detecting said laser beam with a detector, said detector having plurality of lenses placed side by side constituting a single block, a scale plate of sensors on which are placed a sensor for each lens, an electronic chip from the power source, a signal capturing electronic chip, and a dirt level control electronic chip;
>
>  capturing the laser beam signal within an operating band;
>
>  activating a relay of the arm thereby activating positioning system to position the laser emitter device; and
>
>  turning off a respective relay of a dirt level indicator.

4. A method for positioning an arm of an ore transport car's turning mechanism, on which arm a laser emitter device is located, comprising the following steps:

>  transmitting a laser beam from a laser emitter device on the arm of the car's turning mechanism, said laser emitter device having a collimator, a laser diode, a laser controlling circuit chip, and a power cable;
>
>  detecting said laser beam with a detector, said detector having plurality of lenses placed side by side constituting a single block, a scale plate of sensors on which are placed a sensor for each lens, an electronic chip from the power source, a signal capturing electronic chip, and a dirt level control electronic chip;
>
>  detecting the absence of a laser beam signal arriving at said detector;
>
>  maintaining a relay arm in an off state thereby maintaining position of the positioning system; and
>
>  indicating with a dirt relay the absence of a laser beam signal in a dirt level indicator.

\* \* \* \* \*